(12) United States Patent
Yoshizawa (10) Patent No.: US 8,196,057 B2
(45) Date of Patent: Jun. 5, 2012

(54) CALCULATOR EMULATION APPARATUS

(75) Inventor: Hiroaki Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 438 days.

(21) Appl. No.: 12/564,284

(22) Filed: Sep. 22, 2009

(65) Prior Publication Data

US 2010/0083161 A1 Apr. 1, 2010

(30) Foreign Application Priority Data

Sep. 26, 2008 (JP) ................................. 2008-248167

(51) Int. Cl.
G06F 3/048 (2006.01)
G06F 15/18 (2006.01)
G06F 15/02 (2006.01)

(52) U.S. Cl. ............ 715/773; 715/771; 715/764; 706/7; 708/130

(58) Field of Classification Search .................. 715/773, 715/771, 764; 706/7; 708/130
See application file for complete search history.

(56) References Cited

U.S. PATENT DOCUMENTS

2002/0140734 A1* 10/2002 Bennett ......................... 345/764
2007/0050432 A1* 3/2007 Yoshizawa .................... 708/130

FOREIGN PATENT DOCUMENTS

| JP | 08-241153 | 9/1996 |
| JP | 2003-141091 | 5/2003 |
| JP | 2003-186383 | 7/2003 |
| JP | 2008-116509 | 5/2008 |

OTHER PUBLICATIONS

Japanese Office Action for 2008-248167 mailed on Sep. 28, 2010.

* cited by examiner

Primary Examiner — Ting Lee
(74) Attorney, Agent, or Firm — Turocy & Watson, LLP (57) ABSTRACT

When keys are typed on a calculator keyboard displayed on an scientific electronic calculator emulation screen, not only are key data items of the calculator stored sequentially into a key log memory and displayed on a log screen, but also a calculation process corresponding to the key input is executed and displayed on a calculator display. Then, when the "selector" button on the tool bar is input, a calculator function name to be executed on the basis of the key log displayed on the log screen is retrieved from a function corresponding key log memory and is replaced with a display area of the key log. Then, the display area is displayed. Accordingly, with the key logs displayed on the log screen, what processes the series of key logs are supposed to execute can be recognized easily.

9 Claims, 11 Drawing Sheets

CALCULATOR EMULATION APPARATUS

CROSS-REFERENCE TO RELATED APPLICATIONS

This application is based upon and claims the benefit of priority from prior Japanese Patent Application No. 2008-248167, filed Sep. 26, 2008, the entire contents of which are incorporated herein by reference.

BACKGROUND OF THE INVENTION

1. Field of the Invention

This invention relates to a calculator emulation apparatus which causes a small electronic computer, such as a scientific electronic calculator, to be emulated on a personal computer (PC).

2. Description of the Related Art

In recent years, a small electronic computer, such as a scientific electronic calculator, capable of performing a wide variety of calculations, including functional calculus, has been widely used.

Such a scientific electronic calculator can be emulated by an emulator functioning on a PC as on, for example, the computer emulation apparatus filed by the same applicant (disclosed in Japanese Patent Application No. 2006-297095 and Jpn. Pat. Appln. KOKAI Publication No. 2008-116509).

Figure 15:
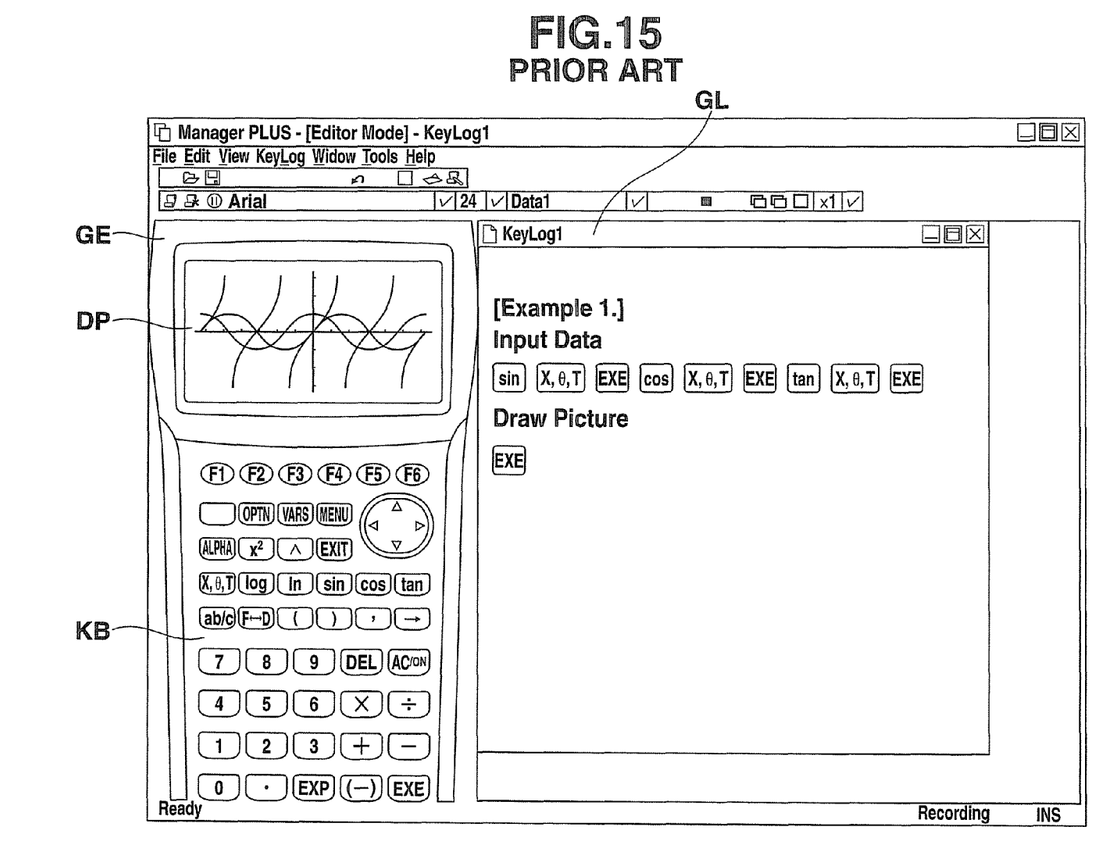
FIG. 15 shows a conventional operation screen when a scientific electronic calculator emulator is caused to function on the PC.

FIG. 15 shows a conventional operating screen when a scientific electronic calculator emulator is caused to function on a PC.

In FIG. 15, a scientific electronic calculator emulation screen GE is displayed on the left of the PC screen. When a desired key on the keyboard KB is specified by the mouse cursor and clicked, a process corresponding to the key operation is executed and the contents displayed on the calculator display DP are updated.

At this time, the history data of the key input on the keyboard KB can be recorded as key log data and displayed as a log screen GL to the right of the emulation screen GE. The key log data displayed on the log screen GL can be reproduced later without any change, which enables an identical calculator operation to be reproduced.

A keyboard with a keyboard log acquisition and reproduction function capable of recording key log data corresponding to the user operation and reproducing the recorded key log data has been considered as disclosed in Jpn. Pat. Appln. KOKAI Publication No. 08-241153.

With the conventional scientific electronic calculator emulation apparatus, the scientific electronic calculator emulation screen GE and log screen GL are displayed side by side and the key log data for the scientific electronic calculator is displayed and recorded. The recorded key log data is reproduced later, thereby reproducing a calculator operation.

The key log data displayed on the log screen GL is a history of each item of key data corresponding to the keyboard key operation. Therefore, for key log data for a calculation formula, what calculation the series of key logs corresponds to can be predicted.

However, for key log data when special functions, such as a static calculation function or a graph drawing function, are used, function keys "F1" to "F6" for specifying a desired function from the displayed function selection menu are combined mostly with menu selection cursor keys "↑" and "↓" to create key log data. Therefore, it is difficult to recognize what such a series of key logs is doing.

Accordingly, it has been difficult to modify the key log data on the log screen GL to carry out a different process.

It is, accordingly, an object of the invention to provide a calculator emulation apparatus and a calculator emulation program which enable the user to easily recognize what process is to be carried out by a series of key logs displayed on a log screen when, for example, a scientific electronic calculator is emulated on a PC.

BRIEF SUMMARY OF THE INVENTION

According to an aspect of the invention, there is provided a calculator emulation apparatus which emulates a keyboard and a display unit on a display screen and causes the display unit to display the contents of a calculation process corresponding to the user keyboard operation, the calculator emulation apparatus comprising: key log storage means for storing key log data corresponding to the user keyboard operation; key log display means for displaying key log data stored by the key log storage means; function name display means for replacing the key log data displayed by the key log display means with the function name of a calculation process corresponding to the key log data and displaying the function name; and key log reproduction means for executing a calculation process corresponding to the key log data stored by the key log storage means.

With the present invention, when a scientific electronic calculator is emulated on a PC, the user can easily recognize what processes a series of key logs displayed on the log screen are supposed to execute.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the invention will be explained.

Figure 1:
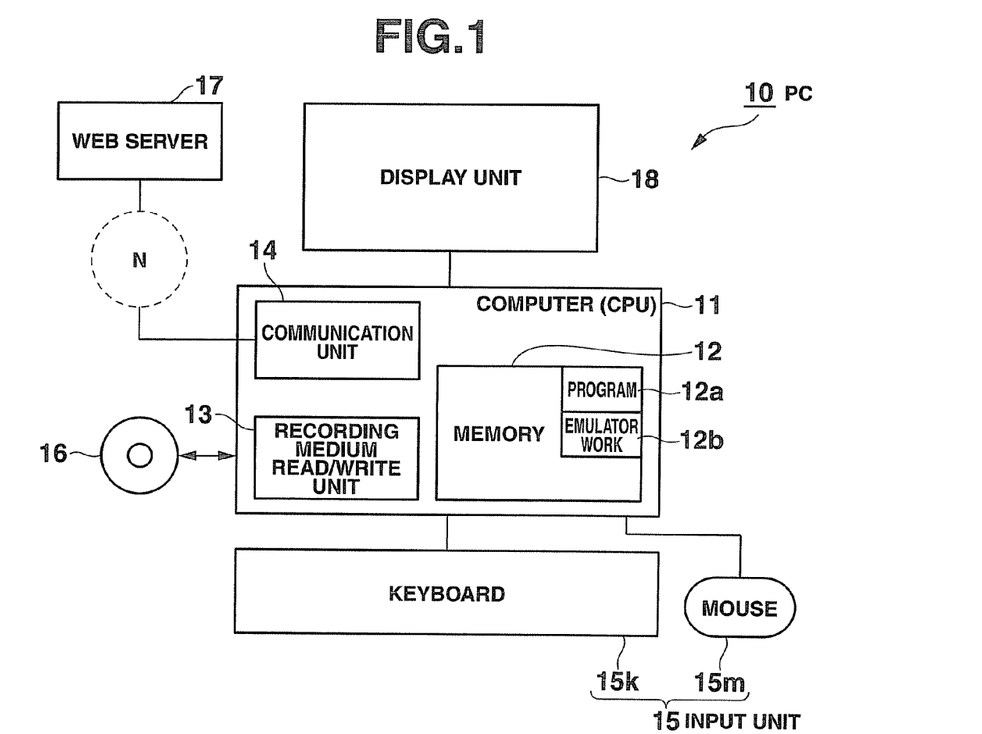
FIG. 1 is a block diagram showing the configuration of the electronic circuitry of a calculator emulation apparatus 10 according to an embodiment of the invention.

FIG. 1 is a block diagram showing the configuration of the electronic circuitry of a calculator emulation apparatus 10 according to an embodiment of the invention.

The calculator emulation apparatus 10 is realized by a personal computer (PC) in which a graph scientific electronic calculator (program) with a graph drawing function has been installed.

The calculator emulation apparatus 10 includes a computer body 11 incorporating a central processing unit (CPU) acting as a control unit. The computer body 11 includes a storage unit (memory) 12, such as a hard disk drive (HDD) or a flash memory, a storage medium read/write unit 13, and a communication unit 14.

According to the input signal from an input unit 15, the CPU activates an apparatus control program previously stored in the storage unit 12, an apparatus control program read from an external storage medium 16, such as a magnetic disk (a FD), an optical disc (a CD or a DVD), or a memory card, into the storage unit 12 via the storage medium read/write unit 13, or an apparatus control program read from a Web server (program server) 17 serving as an external computer terminal by way of a communication network N into the storage unit 12 via the communication unit 14, thereby controlling the operation of each circuit.

The storage unit 12 includes a program memory 12a and an emulator work memory 12b.

Figure 2:
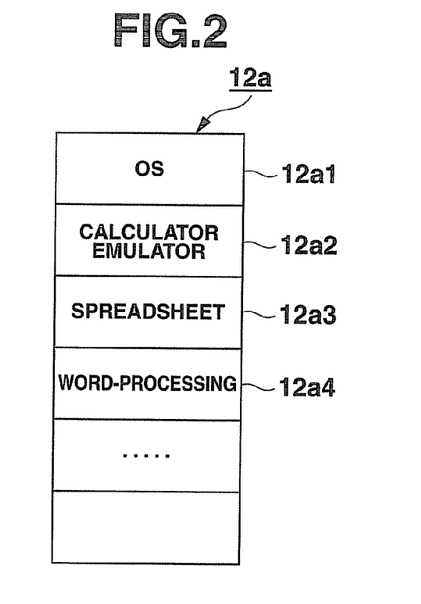
FIG. 2 shows the contents of a program stored in the program memory 12a of the calculator emulation apparatus 10.

FIG. 2 shows the contents of a program stored in the program memory 12a of the calculator emulation apparatus 10.

The program memory 12a stores the apparatus control program (operating system OS) 12a1 read by the CPU immediately after the power supply of the apparatus is turned on. The program memory 12a further stores various application programs, including a graph scientific electronic calculator emulator program 12a2, a spreadsheet application program 12a3, and a word-processing application program 12a4.

Figure 3:
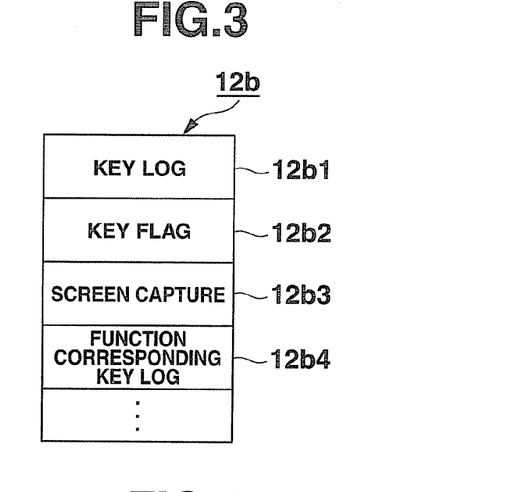
FIG. 3 shows the contents of various data memories secured in the emulator work memory 12b of the calculator emulation apparatus 10.

FIG. 3 shows the contents of various data memories secured in the emulator work memory 12b of the calculator emulation apparatus 10.

In the emulator work memory 12b, a key log memory 12b1, a key flag memory 12b2, a screen capture memory 12b3, a function corresponding key log memory 12b4, and the like are secured.

Figure 4:
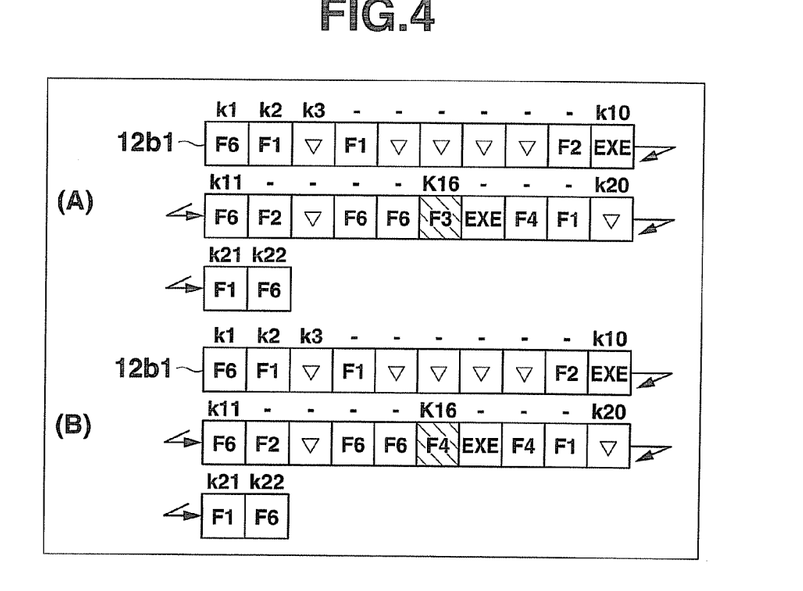
FIG. 4 shows a concrete example of key log data stored in the key log memory 12b1 of the calculator emulation apparatus 10.

FIG. 4 shows a concrete example of key log data stored in the key log memory 12b1 of the calculator emulation apparatus 10.

In the key log memory 12b1, key data items (e.g., [F6] [F1] [V] [F1] . . . ) input from the keyboard KB on the scientific electronic calculator emulation screen GE (see FIG. 8) are stored into the respective key registers K1, K2, K3, K4, . . . sequentially in a key log storage process (see FIG. 6) of the calculator emulator 12a2.

The key log data stored in the key log memory 12b1 shown in FIG. 4(A) and the key log data stored in the key log memory 12b1 shown in FIG. 4(B) are key log data before and after the function is changed in the function change process (see FIG. 9) of the calculator emulator 12a2, respectively. In this case, key data [F3] in the key register K16 is modified to [F4] after the function change.

Figure 5:
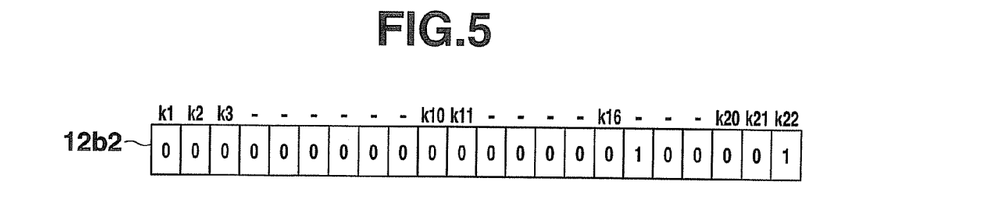
FIG. 5 shows a concrete example of key flag data stored in the key flag memory 12b2 of the calculator emulation apparatus 10.

FIG. 5 shows a concrete example of key flag data stored in the key flag memory 12b2 of the calculator emulation apparatus 10.

In the key flag memory 12b2, flag data ["0" (reproduce)/ "1" (pause)] to control the reproduction and pause of each key data item stored in the key log memory 12b1 is stored in a key log reproduction process (see FIG. 7) of the calculator emulator 12a2. The individual flag data items ["0" (reproduce)/ "1" (pause)] are set and stored so as to correspond to the key registers K1, K2, . . . , respectively.

In the screen capture memory 12b3, screen data displayed on a calculator display DP on the scientific electronic calculator emulation screen GE (see FIG. 8) is acquired and stored sequentially according to the operation of a capture button Bc provided on an emulator tool bar TB in a key log storage process (see FIG. 6) of the calculator emulator 12a2.

Each screen data item stored in the screen capture memory 12b3 is displayed together with the scientific electronic calculator emulation screen GE (see FIG. 8) as capture screens GCn . . . .

In the function corresponding key log memory 12b4, the names of various calculator functions that can be executed by inputting a series of key data items from the keyboard KB on the scientific electronic calculator emulation screen GE (see FIG. 8) and the series of key data items are stored beforehand such that the former are caused to correspond to the latter.

In a function change process (see FIG. 9) of the calculator emulator 12a2, it is determined whether the series of key data items stored in the function corresponding key log memory 12b4 coincides with the series of key log data items stored in the key log memory 12b1 and the name of a function is used for recognition.

The input unit 15 is composed of a keyboard 15K and a mouse 15m. When the calculator emulator 12a2 is activated, the input unit 15 is used to input arbitrary text onto the log screen GL and display the text there, or specify each key displayed on the calculator keyboard KB on the emulation screen GE or the position of the text displayed on the log screen GL.

Figure 8:
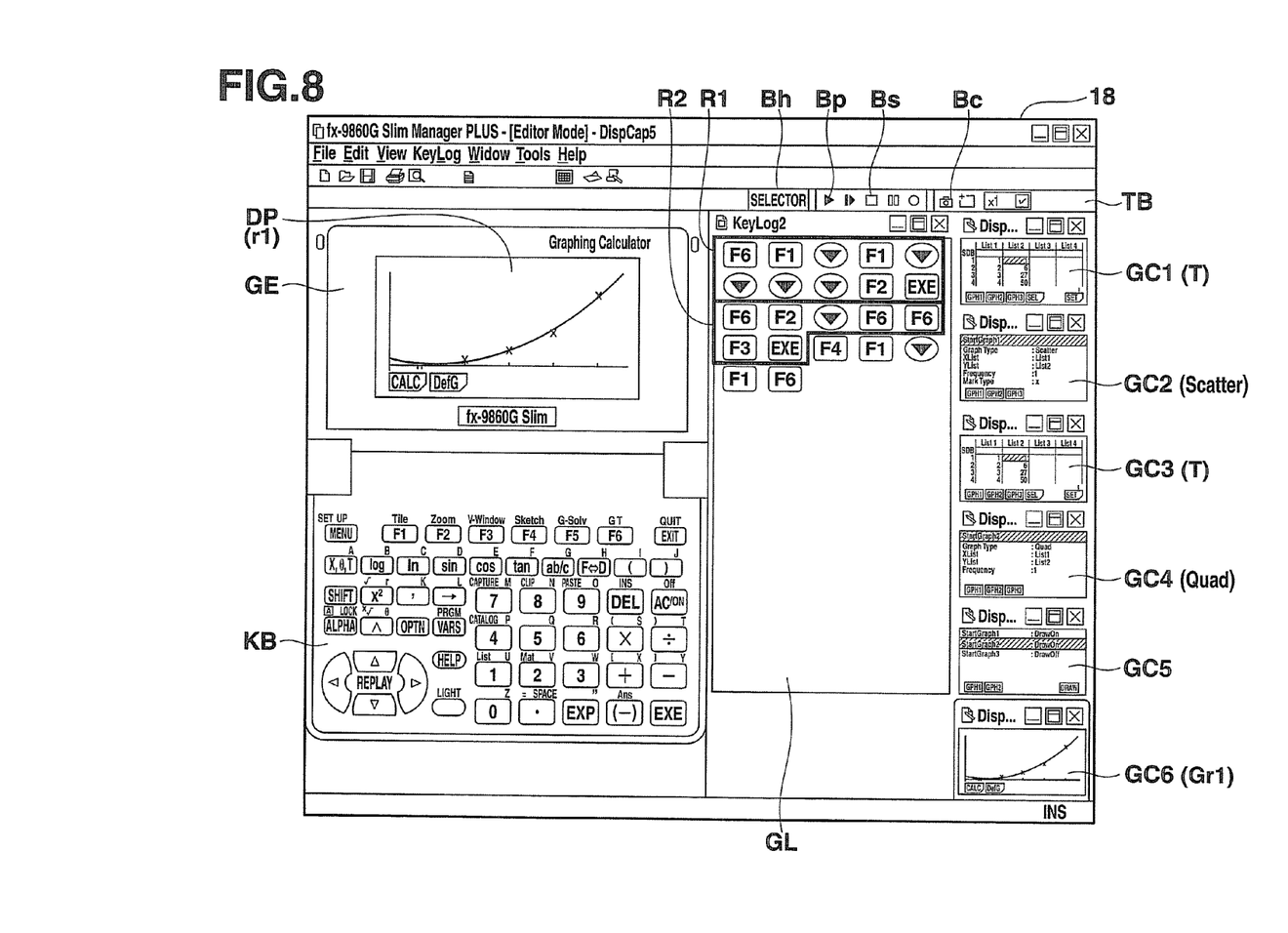
FIG. 8 shows a display operation in the key log storage process or in the key log reproduction process performed by the calculator emulator 12a2 of the calculator emulation apparatus 10.

When the calculator emulator 12a2 is activated, the display unit 18 is a display unit, such as a CRT display unit or a liquid crystal display unit, which displays not only the emulation screen GE but also the log screen GL and capture screen GCn side by side (see FIG. 8).

Next, the operation of the calculator emulation apparatus 10 configured as described above will be explained.

Figure 6:
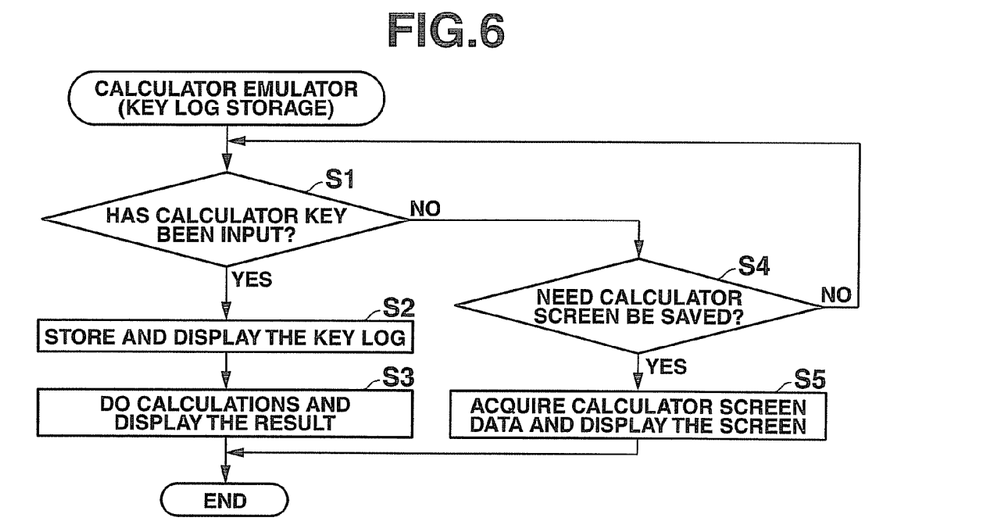
FIG. 6 is a flowchart to explain a key log storage process performed by the calculator emulator 12a2 of the calculator emulation apparatus 10.

FIG. 6 is a flowchart to explain a key log storage process performed by the calculator emulator 12a2 of the calculator emulation apparatus 10.

Figure 7:
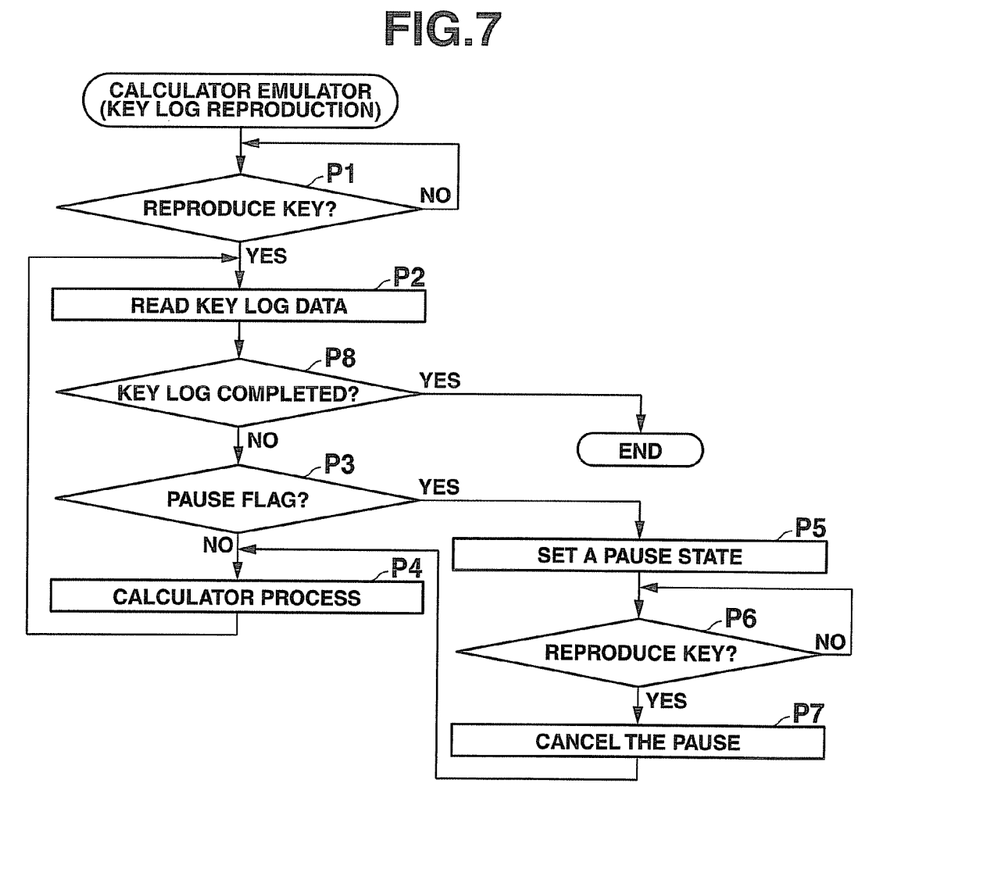
FIG. 7 is a flowchart to explain a key log reproduction process performed by the calculator emulator 12a2 of the calculator emulation apparatus 10.

FIG. 7 is a flowchart to explain a key log reproduction process performed by the calculator emulator 12a2 of the calculator emulation apparatus 10.

FIG. 8 shows a display operation in the key log storage process or in the key log reproduction process performed by the calculator emulator 12a2 of the calculator emulation apparatus 10.

When the scientific electronic calculator emulator program 12a2 has been selected from the various application programs according to the user operation and been activated, not only is an emulator tool bar TB displayed in the upper part of the display unit 18, but also the scientific electronic calculator emulation screen GE and log screen GL are displayed in parallel under the tool bar TB as shown in FIG. 8.

The emulator tool bar TB includes reproduce button Bp and stop button Bs to specify the reproduction and stop of key log data displayed on the log screen GL respectively, capture button Bc to specify the capture of screen data displayed on the calculator display DP on the emulation screen GE, and selector button Bh to switch between key log data displayed on the log screen GL and the name of the function executed using the key log data.

(Key Log Storage Process)

With the scientific electronic calculator emulation screen GE and log screen GL displayed in parallel, a desired key on the calculator keyboard KB on the emulation screen GE is specified by the mouse cursor and clicked, and it is determined that a calculator key has been input (Yes in step S1). The input key data is not only stored in the key log memory 12b1, but also is displayed on the log screen GL (step S2).

At the same time, a process corresponding to the key operation of the calculator keyboard KB is executed and the result of the process is displayed on the calculator display DP (step S3).

The key data items sequentially input in this way are not only stored in the key log memory 12b1 sequentially but also displayed on the log screen GL sequentially and a process corresponding to the key operation is executed, thereby updating the contents displayed on the calculator display DP sequentially (steps S1 to S3).

To save the screen data displayed on the calculator display DP, the user operates capture button Bc on emulator tool bar TB. When capture button Bc has been specified (Yes in step S4), the screen data displayed on the calculator display DP of the emulation screen GE at that time is not only acquired and stored in the screen capture memory 12b3 but also displayed as a capture screen GCn to the right of the log screen GL on the display unit 18 (step S5).

The capture screen GCn is acquired each time capture button Bc is specified by the user's arbitrary operation. The acquired screens are displayed vertically in an array.

FIG. 8 shows an example of the operation of transiting to a key log storage process from a state where desired statistical data T has been created beforehand in the statistic calculation mode of the calculator emulator and the statistical data T has been read and displayed, and displaying a quadratic regression graph. The capture screen GC1 shows the statistical data T. The first key data [F6] enclosed by a thick frame R1 on the log screen GL is a key for transiting to the setting of the graph drawing mode. The subsequent keys up to key data [EXE] are for key logs to set a Scatter graph drawing function. The capture screen GC2 is a Scatter graph drawing setting screen based on the statistical data T.

The next key data items [F6] to [EXE] enclosed by the thick frame R2 on the log screen GL are key log data items for setting a Quad (quadratic regression) graph drawing function according to statistical data T. The capture screen GC4 is a Quad graph drawing setting screen based on the statistical data T.

Key data items [F4] to [F6] on the log screen GL are key log data items for performing graph drawing according to the graph drawing settings. On the calculator display DP of the emulation screen GE, a graph screen Gr1 of a Quad (quadratic regression) graph is displayed according to the statistical data T. The graph screen Gr1 is acquired and displayed as a capture screen GC6.

At this time, the contents of the key data stored in the key log memory 12b1 are as shown in FIG. 4(A).

(Key Log Reproduction Process)

In the calculator emulator, reproduce button Bp on tool bar TB is input after the key log storage process corresponding to the key input is performed, and a key log reproduction process in FIG. 7 is activated (step P1).

Then, the key data displayed on the log screen GL recorded in the key log memory 12b1 is read from the beginning (step P2). It is determined whether a pause flag "1" has been set in the key flag memory 12b2 corresponding to the key register Kn of the read-out key data item (step P3). If a pause flag "1" hasn't been set (No in step P3), a calculation process corresponding to the key data item and a display process are carried out (step P4). Then, the next key data is read out and the calculation process and display update process are repeated similarly (steps P2 to P4).

On the other hand, if it has been determined that a pause flag "1" has been set so as to correspond to the key data item read in step P2 (Yes in step P3), the calculation process is set in a pause state without being executed according to the key data item (step P5).

Then, if reproduce button Bp on tool bar TB is input again (Yes in step P6), the pause setting state is cancelled (step P7), with the result that the calculation process and display update process corresponding to the key data read in step P2 are executed again (step P4).

Thereafter, if it has been determined in the process of reading the key data from the key log memory 12b1 in step P2 that the key log has been completed (Yes in step P8), the key log reproduction process based on the series of key data items is completed (END).

As a result, a calculation process and a display update process corresponding to the key data stored in the key log memory 12b1 and displayed on the log screen GL in the key log storage process are reproduced and executed.

(Function Change Process)

Figure 9:
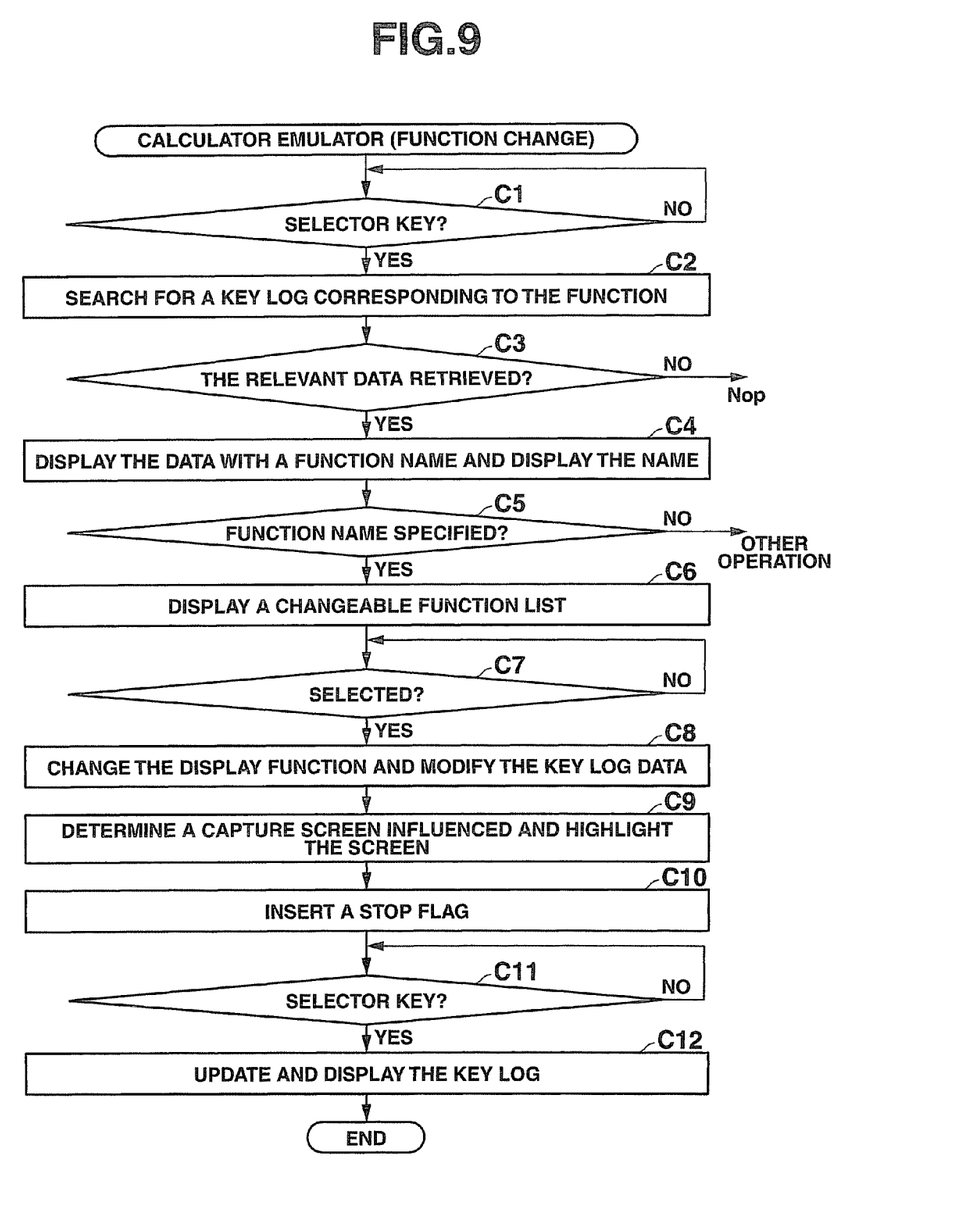
FIG. 9 is a flowchart to explain a key log function change process performed by the calculator emulator 12a2 of the calculator emulation apparatus 10.

FIG. 9 is a flowchart to explain a key log function change process performed by the calculator emulator 12a2 of the calculator emulation apparatus 10.

Figure 10:
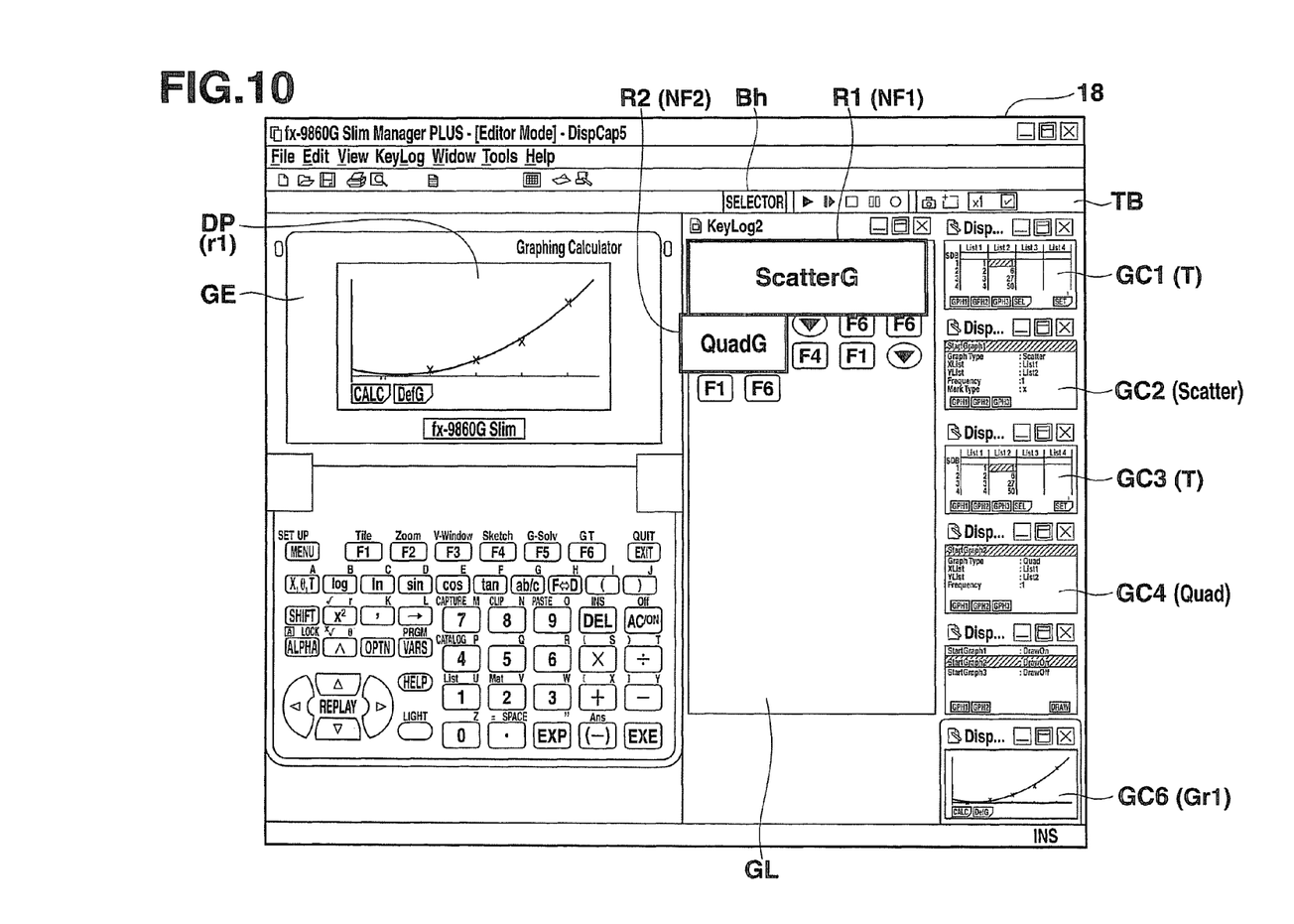
FIG. 10 shows a display operation (part 1) in the key log function change process performed by the calculator emulator 12a2 of the calculator emulation apparatus 10.

FIG. 10 shows a display operation (part 1) in the key log function change process performed by the calculator emulator 12a2 of the calculator emulation apparatus 10.

Figure 11:
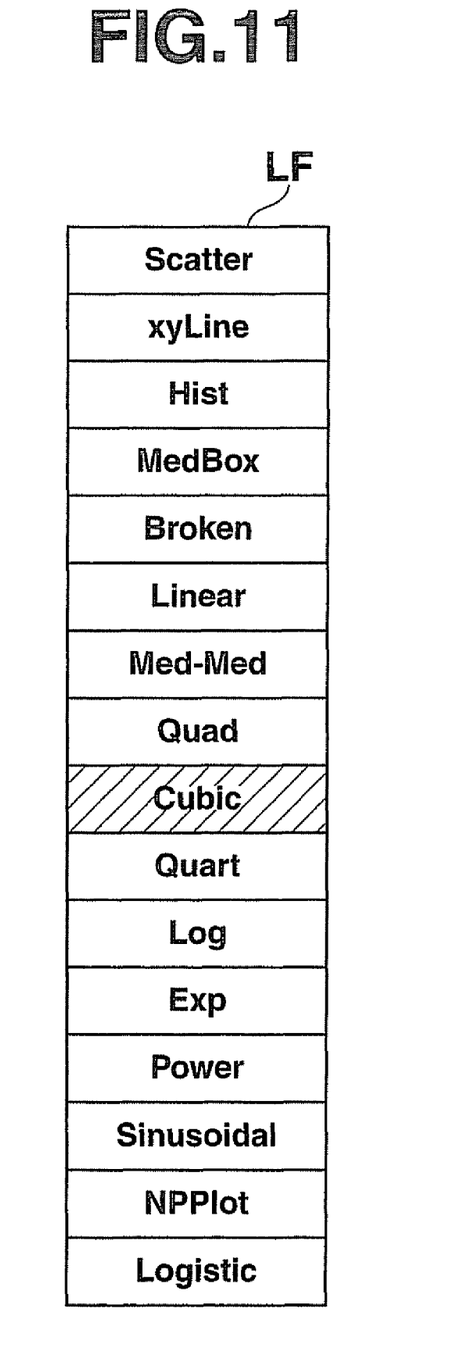
FIG. 11 shows a concrete example of a changeable function list LF displayed in the key log function change process performed by the calculator emulator 12a2 of the calculator emulation apparatus 10.

FIG. 11 shows a concrete example of a changeable function list LF displayed in the key log function change process performed by the calculator emulator 12a2 of the calculator emulation apparatus 10.

Figure 12:
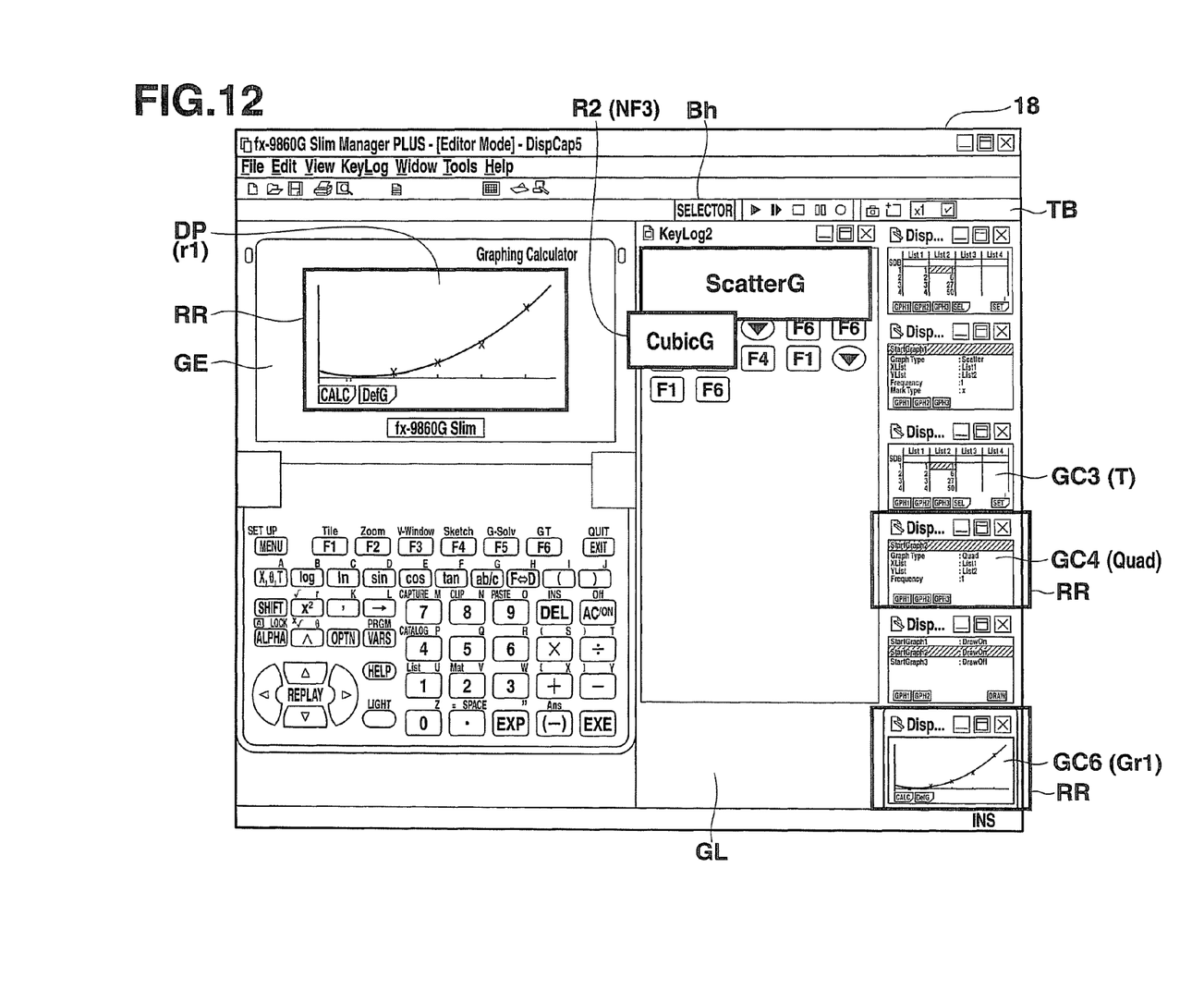
FIG. 12 shows a display operation (part 2) in the key log function change process performed by the calculator emulator 12a2 of the calculator emulation apparatus 10.

FIG. 12 shows a display operation (part 2) in the key log function change process performed by the calculator emulator 12a2 of the calculator emulation apparatus 10.

Figure 13:
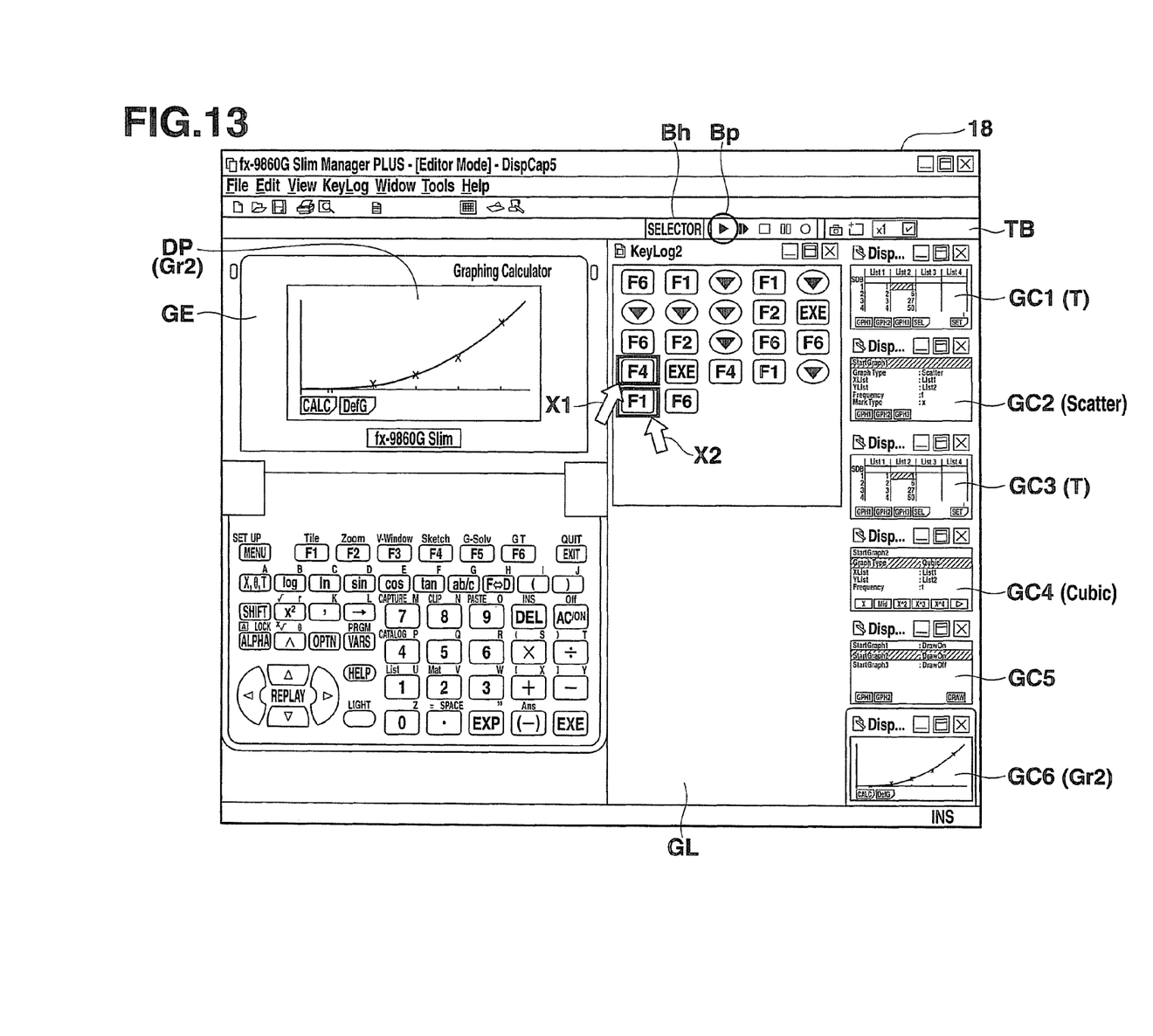
FIG. 13 shows a display operation (part 3) in the key log function change process performed by the calculator emulator 12a2 of the calculator emulation apparatus 10.

FIG. 13 shows a display operation (part 3) in the key log function change process performed by the calculator emulator 12a2 of the calculator emulation apparatus 10.

For example, in the display state of FIG. 8, if "selector" button Bh on tool bar TB is input to display what function the key log displayed on the log screen GL executes, the function change process in FIG. 9 is activated (Yes in step C1)

Then, first, the key data stored in the key log memory 12b1 is searched for key log data that coincides with a series of key data items caused to correspond to the names of the various calculator functions previously stored in the function corresponding key log memory 12b4 (step C2). Then, it is determined whether there is any key log data coinciding with the series of key data items (step C3).

Here, if it has been determined that key log data coinciding with the series of key data items has been retrieved (Yes in step C3), the display area of the retrieved key log data on the log screen GL is replaced with the name of the corresponding calculator function and the name is displayed (step C4).

Specifically, on the log screen GL of FIG. 8, it has been determined that key logs [F6] [F1] to [F2] [EXE] enclosed by thick frame R1 coincide with a series of key data items caused to correspond to the calculator function name "ScatterG" stored in the function corresponding key log memory 12b4 and that key logs [F6] [F2] to [F3] [EXE] enclosed by thick frame R2 coincide with a series of key data items caused to correspond to the calculator function name "QuadG" (Yes in step C3). Then, as shown in FIG. 10, the area of thick frame R1 is replaced with the corresponding calculator function name "ScatterG" (NF1) and the name is displayed. At the same time, the area of thick frame R2 is replaced with the corresponding calculator function name "QuadG" (NF2) and the name is displayed (steps C3→C4).

Accordingly, if it is impossible to recognize at a glance what calculator function the key log data displayed on the log screen GL executes, the user operates "selector" button Bh to replace the display area of the key log data with the corresponding calculator function name (NFn) and display the name, making it possible to check the contents of the process.

As described above, when the user wants to change the calculator function corresponding to the present key log data to another calculator function and executes the function of the calculator, the user specifies the function name the user wants to change. For example, if the calculator function "QuadG" (NF2) is specified by clicking the name with a mouse cursor, the operation is detected (Yes in step C5), and the name of another calculator function that can be replaced with the specified calculator function is read from the function corresponding key log memory 12b4 and displayed as a changeable function list LF on a window on the log screen GL as shown in FIG. 11 (step C6).

Then, if a desired function name (e.g., the drawing function name "Cubic" of a cubic regression graph) is selected from the changeable function list LF (Yes in step C7), "QuadG" is changed to "CubicG" (NF3) and "CubicG" is displayed as shown in FIG. 12. At the same time, key log data items [F6] [F2] to [F3] [EXE] corresponding to the unchanged calculator function "quadratic regression graph drawing function (QuadG)" stored in the key log memory 12b1 (see FIG. 4(A)) are modified to key log data items [F6] [F2] to [F4] [EXE] corresponding to the changed calculator function "cubic regression graph drawing function (CubicG)" (see FIG. 4(B)) and key log data items [F6] [F2] to [F4] [EXE] are stored (step C8).

Then, a calculator process according to key log data items [F6] [F2] to [F4] [EXE] corresponding to the changed calculator function "cubic regression graph drawing function (CubicG)" is internally carried out, and the capture screens GC4, GC6 whose contents are changed (or influenced) among the capture screens GC1 to GC6 displayed at present are determined, and the determined screens are highlighted by enclosing them with, for example, a red frame RR as shown in FIG. 12 (step C9). In the concrete example of FIG. 12, since the capture screen GC6 to be changed is screen data captured from the calculator display DP of the emulation screen GE, the calculator display DP is also highlighted by enclosing it with the red frame RR.

Then, as shown in FIG. 5, a stop flag "1" is set in the key flag memory 12b2 corresponding to the key data (in this case, [EXE] corresponding to key register K17 and [F6] corresponding key register K22) for causing the capture screens GC4 "quadratic regression graph drawing setting screen (Quad)" and GC6 "quadratic regression graph screen (Gr1)" to be displayed on the calculator display DP (step C10).

As described above, in a state where the calculator function "quadratic regression graph drawing function (QuadG)" has been changed to a "cubic regression graph drawing function (CubicG)", if "selector" button Bh is input, the replacement display of the calculator function name on the log screen GL is cancelled and the log screen GL of the display unit 18 is updated according to key log data items [F6] [F2] to [F4] [EXE] . . . modified in step C8 (refer to FIG. 4(B)) as shown in FIG. 13 (step C12).

Accordingly, after the key data items (key log) displayed on the log screen GL have been replaced with the corresponding calculator function names, an arbitrary one of them can be changed to another changeable calculator function. The key log data items can be updated according to the changed calculator function.

After the key log on the log screen GL has been updated and displayed according to the key log function change process of FIG. 9 (refer to FIG. 4(B) and the log screen GL in FIG. 13), if reproduce button Bp on tool bar TB is input to execute a calculator process according to the updated key log, a key log reproduction process of FIG. 7 is activated (step P1).

Then, the key log data items updated and stored in the key log memory 12b1 and displayed on the present log screen GL are read sequentially and a calculation process based on the key log data and a display update process are executed repeatedly (steps P2 to P4).

That is, by the calculator process that corresponds to the first series of key logs [F6] [F1] to [F2] [EXE], the drawing function for a scatter graph corresponding to statistical data T is executed, with the result that the statistical data T, scatter graph drawing setting screen (Scatter), etc. are displayed sequentially on the calculator display DP of the emulation screen GE.

Then, a series of key logs [F6] [F2] to [F4] [EXE] modified so as to draw a Qubic (cubic regression) graph is read sequentially and processed. Then, of the series of key logs [F6] [F2] to [F4] [EXE], when key data item [EXE] corresponding to key register K17 has been read, it is determined that stop flag "1" has been set in the key flag memory 12b2 (Yes in step P3) and the calculator process is stopped temporarily immediately before a Qubic (cubic regression) graph is displayed on the calculator display DP of the drawing setting screen (Qubic), that is, at the time when the calculator process corresponding to key data item [F4] indicated by arrow X1 is executed (step P5).

Then, if reproduce button Bp on tool bar TB is input again by the user operation (Yes in step P6), the calculator process according to key data item [EXE] temporarily stopped is started again and a Qubic (cubic regression) graph is displayed on the calculator display DP of the drawing setting screen (Qubic) (steps P7→P4).

Then, the calculator process corresponding to a subsequent series of key logs [F4] [F1] [V] [F1] [F6] is executed and a drawing start selection screen for a Qubic (cubic regression) graph corresponding to the statistical data T is displayed on the calculator display DP of the emulation screen GE (steps P2 to P4).

Of the series of key logs [F4] [F1] [V] [F1] [F6], when the key data item [F6] corresponding to key register K22 is read out, it is determined that stop flag "1" has been set in the key flag memory 12b2 (Yes in step P3), and the calculator process is stopped temporarily immediately before a Qubic (cubic regression) graph is displayed on the calculator display DP of the graph screen Gr2, that is, at the time when the calculator process corresponding to key data [F1] indicated by arrow X2 is executed (step P5).

Then, when reproduce button Bp on tool bar TB is input again by the user operation (Yes in step P6), the calculator process corresponding to key data item [F6] is started again, with the result that a Qubic (cubic regression) graph is displayed on the calculator display DP of the graph screen Gr2 (steps P7→P4).

When the calculator process corresponding to the key log data after the function change on the log screen GL in the key log function change process is executed, and the calculator process is stopped temporarily at the time when the contents of the display are changed due to the function change. The calculator process is started again when reproduce button Bp is input again. Accordingly, the user can clearly recognize the part where the operation changes the key log function has been changed and understand its contents.

Accordingly, with the calculator emulation function of the calculator emulation apparatus 10 configured as described above, when keys are typed on the calculator keyboard KB displayed on the scientific electronic calculator emulation screen GE in the key log storage process, the calculator key data items are stored sequentially in the key log memory 12b1 and displayed on the log screen GL. At the same time, a calculation process based on the key input is executed and displayed on the calculator display DP. Then, when "selector" button Bh on tool bar TB is input, the calculator function name (Nfn) executed on the basis of the key log displayed on the log screen GL is retrieved from the function corresponding key log memory 12b4 and replaced with the display area of the key log. Therefore, it is possible to easily recognize what process the series of key logs displayed on the log screen GL are supposed to execute.

Furthermore, with the calculator emulation function, when the user specifies the calculator function name (NFn) corresponding to the key log displayed on the log screen GL, the names of other calculator functions that can be replaced with the specified calculator function are displayed as a changeable function list. If an arbitrary calculator function name is selected from the changeable function list LF, the user-specified calculator function name (NFn) is changed to the selected calculator function name (NFn'), which is then displayed. The corresponding key log is also modified and stored. Accordingly, the function corresponding to the key log displayed on the log screen GL is changed to another changeable function, which enables a desired calculator function to be executed in a key log reproduction process.

Moreover, when the function based on the key log displayed on the log screen GL is changed to another changeable function and the key logs are modified and updated, a reproduce/stop flag is caused to correspond to the key data of the key log where the screen data displayed on the calculator display DP is changed by the key log reproduction after the function change to the screen data before the function change. Accordingly, in the key log reproduction process after the function change, the reproduction process can be stopped temporarily at the time when screen data differing from the display screen data in the key log reproduction process before the function change is displayed, which enables the user to clearly recognize the difference between the calculator operations before and after the function change.

In the key log reproduction process performed by the calculator emulator 12a2 explained according to the flowchart of FIG. 7, the reproduction speed in reading key log data in step P2 may be selectively set by the user.

Figure 14:
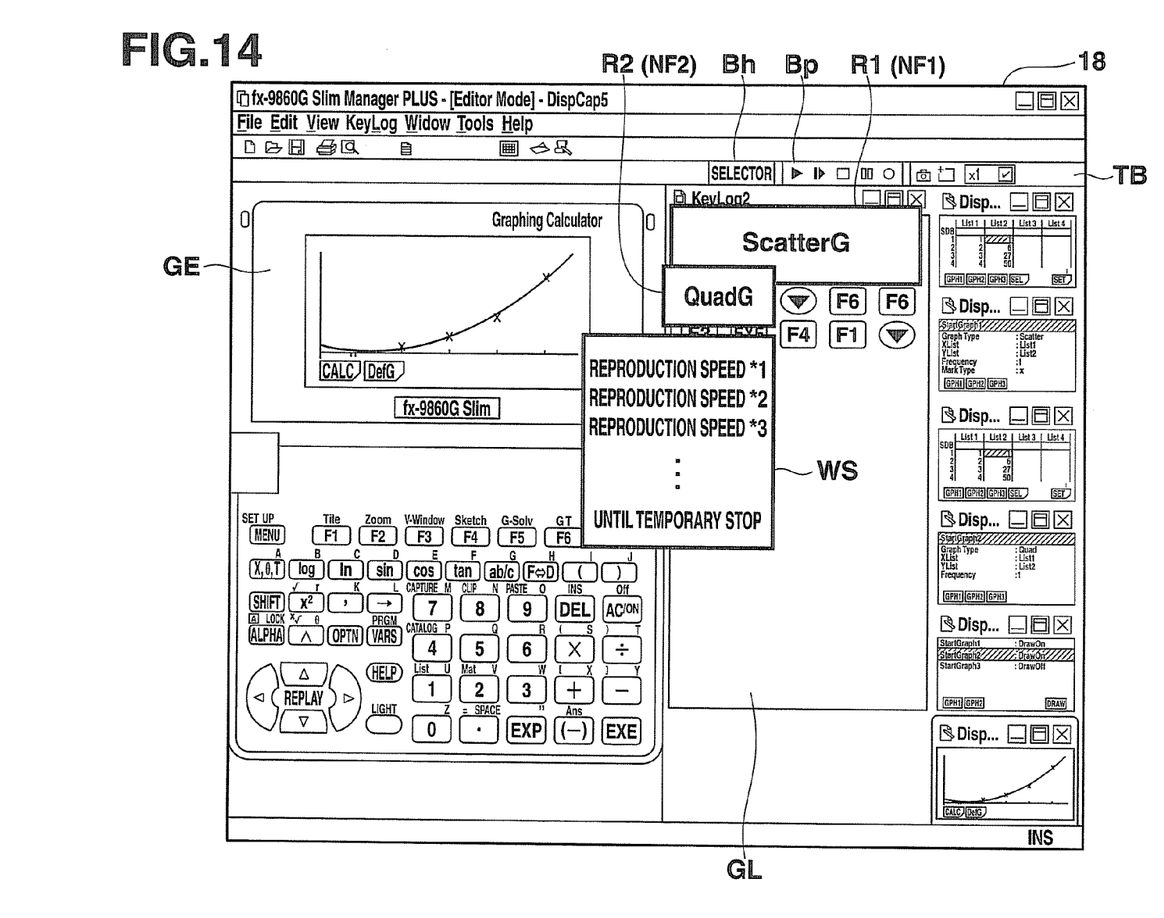
FIG. 14 shows a display operation on a reproduction speed setting window WS on the emulation screen GE displayed on the display unit 18 by the calculator emulator 12a2 of the calculator emulation apparatus 10.

FIG. 14 shows a display operation of a reproduction speed setting window WS on the emulation screen GE displayed on the display unit 18 performed by the calculator emulator 12a2 of the calculator emulation apparatus 10.

When a key log reproduction process is activated by inputting reproduce button Bp on tool bar TB, the reproduction speed setting window WS is displayed on the emulation screen GE as shown in FIG. 14, prompting the user to select a key log reproduction speed.

By selectively setting an arbitrary reproduction speed on the reproduction speed setting window WS, the user can set a reproduction speed arbitrarily in reading a key log in the key log reproduction process (step P2).

The methods of the individual processes of the calculator emulator 12a2 in the calculator emulation apparatus 10 written in the embodiment, including the methods of the key log storage process shown in the flowchart of FIG. 6, the key log reproduction process shown in the flowchart of FIG. 7, and the key log function change process shown in the flowchart of FIG. 8, can be stored in an external storage medium 16, such as a memory card (e.g., a ROM card or a RAM card), a magnetic disk (e.g., a floppy disk or a hard disk), an optical disk (e.g., a CD-ROM or a DVD), or a semiconductor memory, in the form of software code the computer can execute. Then, the medium can be delivered. The calculator emulation apparatus 10 using a PC or the like loads the program stored in the external storage medium 16 into an internal memory 12. The apparatus is controlled by the read-in program, thereby realizing the scientific electronic calculator emulation function explained in the embodiment, which enables the same processes in the aforementioned methods to be carried out.

Furthermore, the data of the programs which realize the above methods can be transferred in the form of program code through a communication network (Internet) N. The program data is loaded from a computer terminal (program server 17) connected to the communication network (Internet) N, thereby realizing the scientific electronic calculator emulation function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A calculator emulation apparatus comprising:
   keyboard emulation means for emulating a keyboard and a display unit of a calculator on a display screen of a personal computer and causing the displaying unit to display the contents of a calculation process corresponding to a user keyboard operation;
   key log storage means for storing key log data corresponding to the user keyboard operation;
   key log display means for displaying key log data stored by the key log storage means;

function name display means for replacing the key log data displayed by the key log display means with the function name of a calculation process corresponding to the key log data and displaying the function name; and key log reproduction means for executing a calculation process corresponding to the key log data stored by the key log storage means.

2. The calculator emulation apparatus according to claim 1, further comprising:

function name list display means for, when the function name corresponding to the key log data is replaced and displayed by the function name display means, displaying the function names of other changeable functions in list form; and key log modification means for, when an arbitrary function name corresponding to the user operation is selected from the function names displayed in list form by the function name list display means, modifying the key log data stored by the key log storage means to key log data corresponding to the function of the selected function name.

3. The calculator emulation apparatus according to claim 2, further comprising:

stop flag setting means for, when the key log data stored by the key log storage means has been modified by the key log modification means, setting a stop flag to stop the key log reproduction means from executing a calculation process at a place corresponding to key log data where the contents of the calculation process displayed on the display unit are made different by a calculation process corresponding to the modified key log data.

4. A computer program which is adapted to be executed by a computing device and comprises a method, the method including:

an emulating step of emulating a keyboard and a display unit of a calculator on a display screen of a personal computer and causing the display unit to display the contents of a calculation process corresponding to a user keyboard operation;

a storage step of storing key log data corresponding to the user keyboard operation into a memory;

a key log display step of displaying key log data stored in the key log storage step on the display unit;

a key log replacement display step of replacing the key log data displayed in the key log display step with the function name of a calculation process corresponding to the key log data and displaying the function name; and a key log reproduction step of executing a calculation process corresponding to the key log data stored in the key log storage step.

5. The computer program according to claim 4, where the method further includes:

a function name list display step of, when the function name corresponding to the key log data is replaced and displayed in the key log replacement step, displaying the function names of other changeable functions in list form; and a key log modification step of, when an arbitrary function name corresponding to the user operation is selected from the function names displayed in list form in the function name list display step, modifying the key log data stored in the key log storage step to key log data corresponding to the function of the selected function name.

6. The computer program according to claim 5, wherein the method further includes:

a stop flag setting step of, when the key log data stored in the key log storage step has been modified in the key log modification step, setting a stop flag to stop the key log reproduction step from executing a calculation process at a place corresponding to key log data where the contents of the calculation process displayed on the display unit are made different by a calculation process corresponding to the modified key log data.

7. A calculator emulation method comprising:

an emulating step of emulating a keyboard and a display unit of a calculator on a display screen of a personal computer and causing the display unit to display the contents of a calculation process corresponding to a user keyboard operation;

a key log storage step of storing key log data corresponding to the user keyboard operation into a memory;

a key log display step of displaying key log data stored into the memory in the key log storage step;

a function name display step of replacing the key log data displayed in the key log display step with the function name of a calculation process corresponding to the key log data and displaying the function name; and a key log reproduction step of executing a calculation process corresponding to the key log data stored in the key log storage step.

8. The calculator emulation method according to claim 7, further comprising:

a function name list display step of, when the function name corresponding to the key log data is replaced and displayed in the function name display step, displaying the function names of other changeable functions in list form; and a key log modification step of, when an arbitrary function name corresponding to the user operation is selected from the function names displayed in list form in the function name list display step, modifying the key log data stored in the key log storage step to key log data corresponding to the function of the selected function name.

9. The calculator emulation method according to claim 8, further comprising:

a stop flag setting step of, when the key log data stored in the key log storage step has been modified in the key log modification step, setting a stop flag to stop the key log reproduction step from executing a calculation process in a place corresponding to key log data where the contents of the calculation process displayed on the display unit are made different by a calculation process corresponding to the modified key log data.

* * * * *